Oct. 31, 1944.    J. J. GREBE ET AL    2,361,369
METHOD OF AND APPARATUS FOR PRODUCING RETICULATED
ARTICLES FROM THERMOPLASTICS
Filed Oct. 2, 1942    2 Sheets-Sheet 1
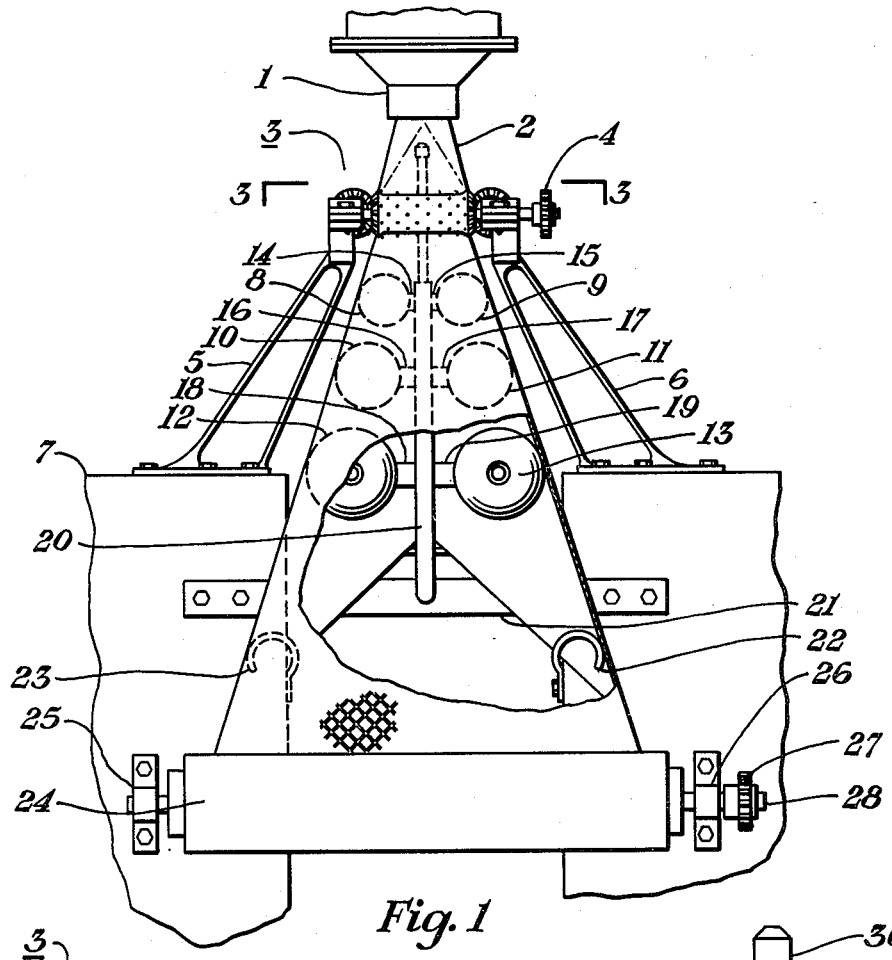
Fig. 1
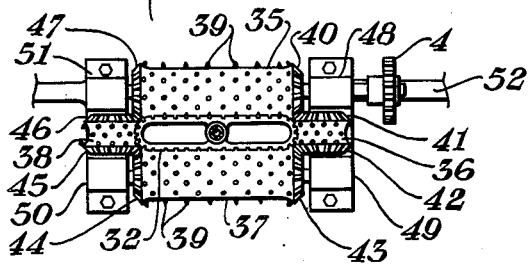
Fig. 3
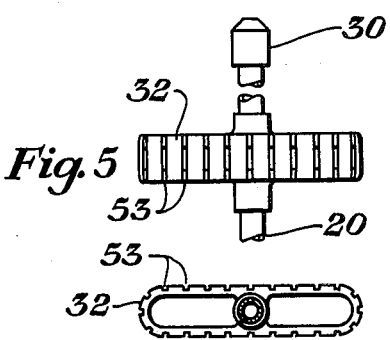
Fig. 5
Fig. 4
INVENTORS
John J. Grebe
Ernest H. Harder
BY
Griswold & Burdick
ATTORNEYS Patented Oct. 31, 1944

2,361,369

UNITED STATES PATENT OFFICE 2,361,369

METHOD OF AND APPARATUS FOR PRODUCING RETICULATED ARTICLES FROM THERMOPLASTICS

John J. Grebe and Ernest H. Harder, Midland, Mich., assignors to The Dow Chemical Company, Midland, Mich., a corporation of Michigan Application October 2, 1942, Serial No. 460,496

3 Claims. (Cl. 18—14)

The invention relates to a method of and apparatus for producing screens, nets, and the like from ductile or cold-drawable thermoplastics.

An object of this invention is to provide a method of producing nets or other reticulate structure comprising perforating a cold-drawable thermoplastic and thereafter subjecting the thermoplastic to a drawing operation, preferably in two directions simultaneously whereby the openings are enlarged and the connecting strips of thermoplastic elongated to give a greatly enlarged reticulated structure.

Another object of the invention is to provide an apparatus which may be employed to produce a net, screen, or the like from a cold-drawable thermoplastic.

The term "cold-drawable thermoplastic" as used herein and in the appended claims is intended to mean polymeric thermoplastic materials which are capable, upon suitable treatment, of being cold-drawn to produce oriented sheets, fibers, or other forms having greatly improved strength properties in comparison to the same material before drawing. The temperature of the cold-drawing operation may be any temperature up to the softening point of the thermoplastic. As an example of such a cold-drawable thermoplastic material might be mentioned polymeric vinylidene chloride. The term "polymeric vinylidene chloride" is intended to include polymers, copolymers, and interpolymers of vinylidene chloride wherein the polymerized vinylidene chloride is present in substantial amount. If polymeric vinylidene chloride is heated to a temperature above its crystalline melting point but below its decomposition point and thereafter rather quickly cooled down to below its softening point and preferably in a range from about 100° C. down to about room temperature or below in the manner more fully described in U. S. Patent 2,233,442, it then becomes cold-drawable. Thereafter, in accordance with the teaching of the patent, it may be subjected to a cold-drawing operation and yields a form possessing marked orientation and greatly improved strength properties. Similarly, the polymerized polyamides such as those obtained by the polymerization of monoamino-monocarboxylic acids or their amide-forming derivatives, or by the condensation polymerization from suitable diamine-dibasic acid mixtures may be melted and thereafter chilled quickly to give a material possessing cold-drawable properties.

The invention then resides in the method and apparatus hereinafter more fully described and particularly defined by the claims, the following description taken in connection with the accompanying drawings serving to illustrate but one of several ways of putting the invention into effect.

In the drawings:

Figure 1 is an elevational view partly in section of an apparatus adapted to produce reticulate structure from a cold-drawable thermoplastic.

Figure 3 is a sectional view taken along lines 3—3 of Figure 1.

Figure 4 is an enlarged view, in greater detail, of an element of Figure 3.

Figure 5 is a top plan view of the element shown in Figure 4.

Figure 2:
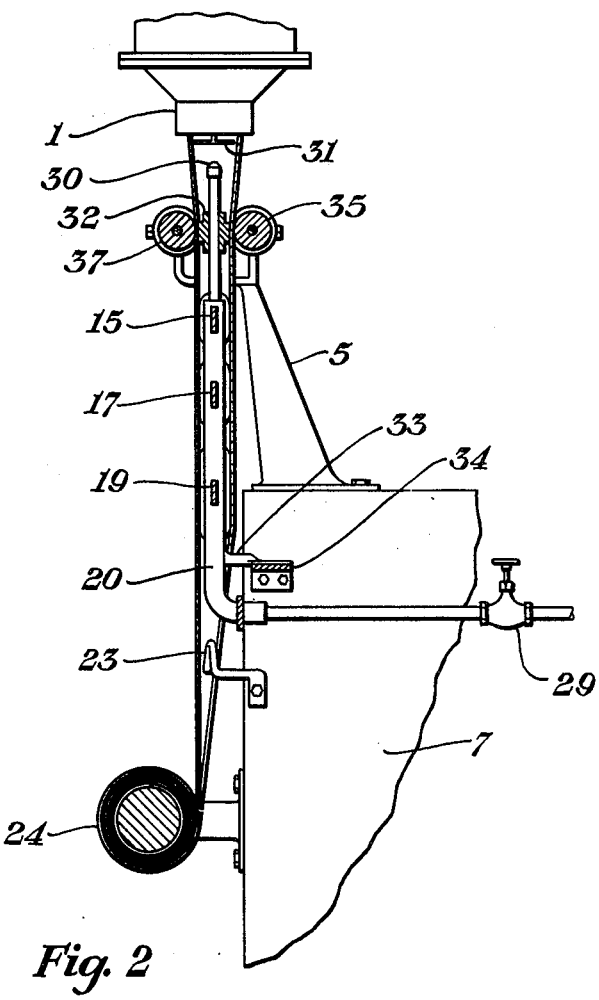
Figure 2 is a side elevation partly in section of the device of Figure 1.

Referring to Figure 1, the cold-drawable thermoplastic is shown issuing from a conventional extrusion head 1 in the form of a tube 2. Thereafter the tube is led through perforating rolls designated generally by numeral 3 shown in greater detail in Figure 3, which are adapted to be driven by sprocket 4. Braces 5 and 6 serve to support the perforating rolls and their bearings, and are in turn, supported by frame 7. A series of stretching or spreading rolls 8, 9, 10, 11, 12, and 13 are provided for expanding the perforate tube and are adapted to operate interiorly of the thermoplastic tube. These rolls are supported by braces 14, 15, 16, 17, 18, and 19 attached to pipe 20. A brace 21 secured to frame 7 supports pipe 20. After passing the spreading rolls, the thermoplastic tube is cut or slit by a suitably positioned knife, as shown in Figure 2. Spreader guides 22 and 23 act to spread the split tube to form a sheet which is taken up by receiving reel 24. This receiving reel 24 is supported at either end by bearings 25 and 26, and is adapted to be driven through sprocket 27 keyed to the reel shaft 28.

As shown in Figure 2, valve 29 controls pipe 20 which extends centrally through the thermoplastic tube toward the extrusion head 1, and ends in a nozzle 30 which is adapted to eject a stream of fluid against dispersion plate 31 supported by extrusion head 1. The pipe 20 passes through and supports the perforating roll guide plate 32 located between the perforating rolls. A knife 33 is supported by a brace 34 which is in turn attached to frame 7. The knife serves to slit the thermoplastic tube as the latter is drawn along to the receiving reel.

Referring now to the detail of Figure 3, it will be seen that the perforating rolls, designed generally by numeral 3, comprise four separate rolls 35, 36, 37, and 38, having numerous perforating knives or punches 39 which register with slots in the guide plate 32, after penetrating the thermoplastic tube. The various rolls are geared together by intermeshing gears 40, 41, 42, 43, 44, 45, 46, and 47. The rolls are supported in bearings 48, 49, 50, and 51, respectively. The sprocket 4 is keyed to roll shaft 52 of roll 35 and serves as a means whereby the perforating rolls may be driven simultaneously.

In the enlarged detail of Figures 4 and 5, the perforating roll guide plate 32 is shown with numerous slots 53, which accommodate the perorating knives 39 as they penetrate through the thermoplastic tube. At the same time, the guide plate 32 serves to support the thermoplastic tube during the perforating operation.

The operation of the method and apparatus will be best understood from the following description of producing a reticulate structure from polymeric vinylidene chloride employing the apparatus of the drawings. The polymeric vinylidene chloride is caused to issue in the form of a tube from the extrusion head 1 of conventional design, and at the same time cooling fluid is allowed to flow into the pipe 20 and issues against the dispersion plate 31 where it effects a rapid cooling of the tube to a temperature preferably in the neighborhood of 15°–30° C. The tube is then led over the perforating roll guide plate 32 and perforated by the perforating knives 39 carried by the rolls. The thermoplastic tube is then in a cold-drawable condition and is thereafter led over spreading or stretching rolls 8, 9, 10, 11, 12, and 13 whereby the thermoplastic tube is stretched in a lateral direction. After the tube has been stretched in a lateral direction, it is brought into contact with the upwardly projecting knife 33 and slit so as to form a single sheet. Almost simultaneously the thermoplastic sheet is stretched lengthwise by causing the take up reel 24 to revolve at a rate such as will stretch the thermoplastic sheet lengthwise the desired amount. As the sheet approaches the reel 24 guides 22 and 23 act to spread the thermoplastic into a flat sheet.

In the foregoing manner, the holes formed in the thermoplastic by the knives or punches are greatly enlarged and a finished sheet is provided with uniformly enlarged holes and interconnecting webs of thermoplastic having any desired relationship of web area to hole area, depending on the extent and size of the perforations and the amount of stretching. Thus, a finished net or reticulate article is provided and it will be apparent that the finished article may have holes of a square contour or practically any desired shape, depending on the shape of the perforating knives and the manner of stretching. For example, it will be apparent that the sheet may be stretched more in one direction than in the other, in which case, the finished article will possess holes which are longer along the axes of greatest stretching of the thermoplastic sheet.

Ordinarily in carrying out the invention, it will only be necessary to cut holes in the sheet at the desired intervals without removing any of the thermoplastic and as the stretching operation proceeds all of the thermoplastic will be used up in forming the interconnecting webs without any waste of thermoplastic whatsoever. This is highly advantageous since waste is entirely eliminated. At the same time, it will be appreciated that nets can be produced without the necessity of employing knots to join the cords and thus further saving in material effected, since roughly 50 per cent of the material in an ordinary net is used up in knotting the cords together.

We claim:

1. In a method of forming a reticulate structure from a thermoplastic, the steps which comprise extruding a thermoplastic of the type capable of being rendered cold-drawable in the form of a tube, rapidly cooling the thermoplastic tube to render it cold-drawable, perforating the tube, and stretching the tube crosswise and lengthwise.

2. In a method of forming a reticulate structure from a thermoplastic, the steps which comprise extruding a thermoplastic of the type capable of being rendered cold-drawable in the form of a tube, cooling the thermoplastic tube to render it cold-drawable, perforating the tube, stretching the tube crosswise and lengthwise, and slitting the tube to form a sheet.

3. In an apparatus for forming a reticulate structure from a cold-drawable thermoplastic, the combination which includes an extruder adapted to extrude thermoplastic tubing, means to rapidly cool the extruded tubing, means to perforate the tube, means adapted to stretch the perforate tube laterally, means to slit the tube longitudinally to form a sheet, and means including a take-up reel adapted to stretch the sheet longitudinally.

JOHN J. GREBE.
ERNEST H. HARDER.